Feb. 8, 1966  R. W. SCHOOLEY, JR  3,233,328
WEB WIDTH MEASURING AND RECORDING APPARATUS
Filed July 21, 1959  2 Sheets-Sheet 1
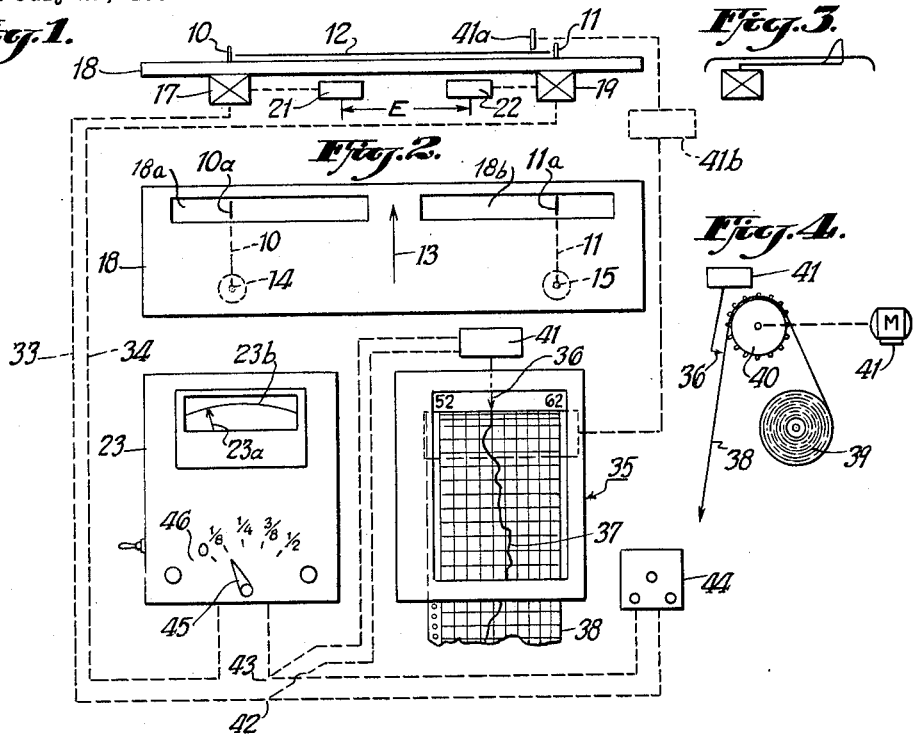
INVENTOR.
ROBERT W. SCHOOLEY, JR.
BY
Ward, Neal, Haselton, Orme & McElhannon
ATTORNEYS.

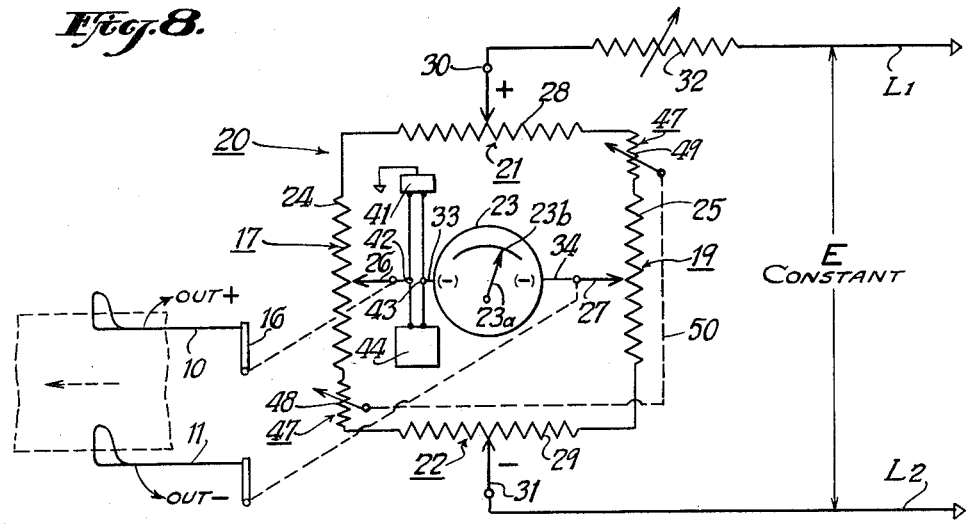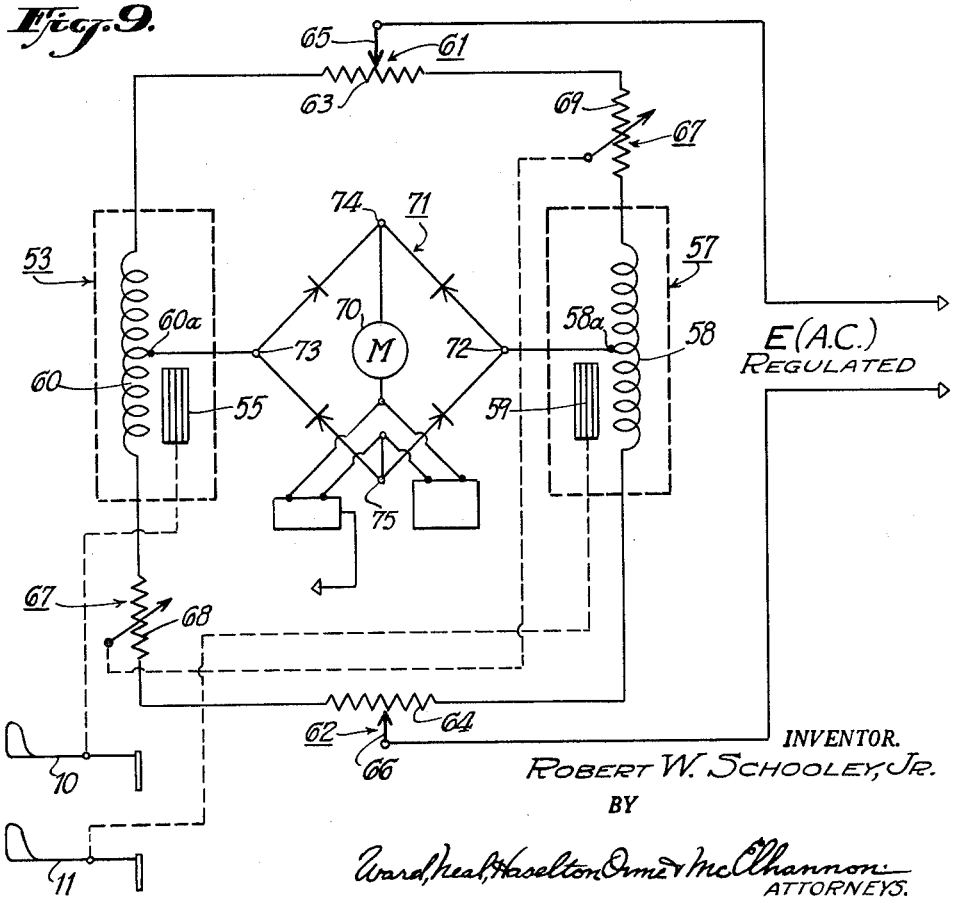

United States Patent Office 3,233,328
Patented Feb. 8, 1966

3,233,328
WEB WIDTH MEASURING AND RECORDING APPARATUS
Robert W. Schooley, Jr., R.D. 2, Lebanon, N.J.
Filed July 21, 1959, Ser. No. 828,570
3 Claims. (Cl. 33—143)

This invention relates to web width measuring devices, and more particularly to apparatus for continuously recording and indicating the width of a moving web.

In the manufacture of web material such as textiles there is a real need for providing a constant record of the web width along its length, by a graphical or visual indication thereof preferably on a paper strip which can be easily detached or torn from the recording means and attached to each roll or bolt of such material, thereby to locate conspicuously upon a small scale document any narrow sections of the web. Such a document of web width should be produced for each individual bolt of textile material and can be formed by moving a stylus over a moving strip of paper. Proper selection of bolts in the manufacture of for example, garments is thus greatly assisted. Such a record enables manufacturers to guarantee minimum widths of the bolts of fabric to within heretofore unattained degrees of accuracy, for example to within one part in six hundred in a web whose average width is sixty inches. In certain forms of the invention a considerably higher degree of accuracy can be attained, for example, one part in twelve hundred, and even higher degrees of accuracy are achievable if necessary. In the textile and needle trades industries a small error in the so-called "spreading" procedure can mean the difference between profit and loss or success and failure for a manufacturer.

One of the objects of the present invention is to provide a relatively low cost measuring device of the character above mentioned which greatly simplifies such measuring task, the latter in the past having proved to be of substantial cost and difficulty, particularly in the textile and needle trades industries.

Prior art apparatus of this general class heretofore proposed have been beset by substantial problems because of the practical difficulty in gauging the transverse dimension of the web when it is of soft material such as cloth due to the tendency of the edges of such cloth to curl even if subjected to a very small contact pressure. Further, such prior art devices employing optical or pneumatic edge sensing means have not proved satisfactory because they become clogged with foreign matter such as lint, this disadvantage being particularly troublesome in the textile manufacturing industry.

Furthermore, apparatus of this general class heretofore suggested has been of very high cost and extreme complexity which have made them impractical of use in many trades, particularly the highly competitive textile and needle trades. This has made it necessary for relatively crude techniques to be employed, for example periodic stopping of the moving web and measuring the transverse dimension by a conventional yardstick. This in turn reduces production and incongruously and often unrealized by manufacturers adds very severely to the cost of labor and generally to production costs.

The novel apparatus can be employed for measuring the width of webs such as fabrics as they are produced from looms or such webs as they are unrolled at substantial speed from already manufactured bolts.

The width readings taken by prior techniques such as the one mentioned above, wherein the web is intermittently stopped and the width measured by a yardstick, are not only frequently in error but require correction usually before they can be used in, for example, a cutting room of a garment manufacturer. Referring to intermittent arresting of the movement of the web, and hand measurement of the width, the amount of correction which must be applied to such widths varies from piece to piece but such correction in the case of a textile web usually is equal to twice the width of the binding or selvedge which occurs along the two opposite borders of the goods.

A further object of the present invention is to overcome the above difficulties or to reduce same to insignificance.

The invention, in one aspect thereof, comprises a pair of wands which are mounted in spaced relation in positions on opposite sides of the path of a continuously moveable web. The wands are provided with portions which are capable continuously of contacting respectively the opposite edges of the web although occasionally such portions may bounce slightly but to an insignificant degree. Means are employed for mounting the wands for movement responsive to movement of the edges of the web whereby lateral motion of the web which causes equal movement of the wands in a common direction produces no change in the distance between the edge contacting portions of the wands, but any change in web width produces a change in the distance between such wand portions and results in an unequal movement of the wands in opposite or the same directions, or equal wand movement in opposite directions, or movement of only one wand, the other remaining unmoved. Operatively connected to the wands are means for producing an electrical parameter in response to movement of each of said wands, and further operatively connected to the latter are means for sensing a difference in such electrical parameters responsive to the aforementioned unequal wand movement.

The above and further objects and novel features of the invention will more fully appear in connection with the description given below when considered jointly with the attached drawings, it being understood that such drawings are for purposes of illustration only and do not define the limits of the invention, reference for this latter purpose being had to the appended claims.

In the drawings:

FIGURE 1 is a schematic view with certain elements in section and with parts broken away showing one form of the present invention;

FIGURE 2 is a plan view of a table employed in the present invention over which passes the web the width of which is to be measured;

FIGURE 3 is a side elevation illustrating schematically a web edge sensing wand and a transducer such as a potentiometer, differential transformer or self-synchronous motor, operatively connected thereto;

FIGURE 4 is a schematic view illustrating in side elevation a recording device for marking a trace on a strip of moving sheet material such as paper thereby to give a continuous indication of the width of the web;

FIGURE 5 is a more detailed view of the device as shown in FIGURE 3;

FIGURE 6 is a side elevation of a wand operatively connected to a transducer comprising a differential transformer;

FIGURE 7 is a plan view of the parts shown in FIGURE 6;

FIGURE 8 is a schematic view of a portion of the apparatus of FIGURE 1; and

FIGURE 9 is a schematic view of another form of the invention.

Referring to the drawings, in particular FIGURES 1 and 2 the novel apparatus comprises a pair of wands 10 and 11 which are positioned for sensing the opposite edges of a continuously moving web 12. In the form shown the wands 10 and 11 are mounted for angular movement. The position of the axes of such angular movement are upstream relative to the wands, that is upstream from a point of the view of the direction of motion of the web. The latter moves in the direction of the arrow 13.

The wands 10 and 11 as viewed in FIGURE 2 thus are mounted for angular movement about axes 14 and 15 respectively which comprise the centers of suitable pivots upon which the wands are mounted as is shown in FIGURE 5, wherein the wand 10 is secured to a pivot pin 16 the latter in turn being operatively connected to a potentiometer generally shown at 17, to be described more fully hereinafter.

The wands 10 and 11 each include a web edging sensing finger 10a and 11a respectively (FIGS. 2 and 5). The finger 10a of FIGURE 5 is in the form of a loop, the wand 10 itself being preferably of a highly polished metal such as piano wire and the loop being formed in such a manner that it will inhibit snagging of the edge of the moving web.

The axes 14 and 15, in the form of the invention shown in FIGURES 1 and 2, are perpendicular to the plane of the web 12, however the invention is not limited thereto, it being possible to mount the wands 10 and 11 for angular movement about axes in any suitable attitude relative to the plane of the web. For example it may be possible to mount the wands 10 and 11 for angular motion about axes which are parallel to the plane of the web and located directly thereabove or therebelow. Any other suitable attitude of such axes may be employed. Further, the invention is not limited to the mounting of the wands for angular movement but also embraces wands which are movable lineally as well as angularly. For example, there may be employed wands which move lineally in a direction transverse to the direction of motion of the web and which are operatively connected to the aforementioned electrical parameter generating devices and means for sensing a differential in such parameters.

As viewed in FIGURES 1 and 2 the wands 10 and 11 are mounted for operation in connection with a table 18 over which the web is drawn. The table 18 may support the two potentiometers one of which has been mentioned above designated 17 (FIGURE 5) which mounts the wand 10. A similar potentiometer 19 is employed for operative interconnection with the wand 11. The table 18, as shown, is provided with two slots 18a and 18b up through which the web edge sensing fingers 10a and 11a of the wands protrude to contact the web edges.

Thus the invention embraces the mounting of the wands by suitable means for facilitating movement thereof responsive to the movement of the web edges whereby lateral motion of the web which causes equal movement of the wands in a common direction produces no change in the distance between said wand fingers 10a, 11a but any change in the web width produces promptly a change in such distance between the wand fingers and results in an unequal movement of the wands, this occurring in opposite or the same directions, or equal wand movement in opposite directions, or movement of only one wand, the other remaining unmoved.

It is the sensing of the aforementioned unequal movement of the wands which is measured by the present apparatus in a novel way by means for producing and comparing electrical parameters, two being produced, one in response to the movement of each of the wands. In the form shown in FIG. 1 an electrical parameter is produced by each of the potentiometers 17 and 19 and suitable means are employed for sensing a difference in such parameters responsive to the aforementioned unequal wand movement. In the embodiment of FIGURES 1 and 8 the means for producing and sensing the difference in such parameters responsive to the aforementioned unequal wand movement is described as follows: a bridge circuit 20 (FIG. 8) is employed in which the potentiometers 17 and 19 are connected, the bridge circuit, in the form shown, comprising a Wheatstone bridge type which is balanceable. The Wheatstone bridge employs in the circuit not only the aforementioned potentiometers 17 and 19 but also potentiometers 21 and 22. The potentiometers 21 and 22 are adjustable to obtain a desired balance and zero reading of the bridge by means of a meter 23 which is connected across the bridge in a well known way.

The potentiometers 17 and 19 embrace resistances 24 and 25 respectively, and wiper or contact arms 26 and 27 respectively. The contact arms 26 and 27 are angularly shiftable in the form shown in FIG. 8 and are operatively connected to the wands 10 and 11 respectively preferably by a direct connection. That is the pivot 16 of the wand 10 is directly mechanically connected to the contact arm 26. The potentiometers 17 and 19 are designed in such a way that they are actuatable by a torque of very low degree which will not produce any appreciable resistance to the angular motion of their respective wands.

The potentiometers 21 and 22 in turn embrace resistances 28 and 29 and also the wiper or contact arms 30 and 31 which latter two arms are adjustable for the purposes aforementioned for achieving balance and zero adjustment.

Referring again to the potentiometers 21 and 22, and the term balance as employed therewith, it should be noted that these potentiometers are employed for adjusting the flow of current through the resistances 24 and 25 of the other two potentiometers 17 and 19 in such a way that a selected amount of angular movement of the wand 10 will produce a range of current indication upon the meter 23 which is identical to the range of current indication for the same angular movement of the wand 11.

The potentiometers 21 and 22 are also employed for adjusting the bridge circuit to a selected norm or zero adjustment that is for producing a selected norm or zero position of indicating pointer 23a upon a scale 23b of the meter 23.

The contact or wiper arms 30 and 31 are connected to leads $L_1$ and $L_2$ across which a constant or regulated voltage E is impressed by a suitable source of electrical energy (not shown).

Interposed in the lead $L_1$ there is employed a variable resistance 32 for adjusting the range or sensitivity of the bridge circuit of FIG. 8.

The operative interconnection of the potentiometers 17, 19, 21 and 22 to the meter 23 is shown in FIG. 1 by the operative interconnecting lines 33 and 34, and in FIG. 8 by lines bearing the same respective numerals.

The means for indicating the difference in electrical parameters produced by the form of the invention shown in FIG. 1 embrace not only the meter 23 aforementioned but also a continuous trace recording apparatus designated generally at 35 which includes a stylus 36 which marks a trace 37 upon a moving strip of paper or the like 38. Referring to FIG. 4 the strip of paper 38 is unrolled from a supply roll 39 and passed over a serrated roll 40 which is driven by a motor 40a, the stylus 36 engaging the moving strip of paper 38 in the manner shown in this figure under the influence of a stylus moving means 41 which responds to the output of meter 23. Alternatively, the serrated roll 40 can be driven, as in FIG. 1 by a wheel 41a riding on the web 12 and acting through a reduction gear 41b.

The manner of electrically interconnecting the stylus moving device 41 to the bridge circuit is illustrated both in FIGS. 1 and 8 and comprises, in this form of the invention, connecting same in series with the meter 23 across the terminals 42 and 43 of lead 33 as shown.

The electrical parameter comprising the current flowing in the lead 33 namely the parameter represented by the meter 23 also can control if desired web manufacturing or web ingredient control means 44 (FIG. 1 and 8).

The control means 44, for example in a paper machine may control the ingredients of the web such as controlling the quantity of fibre input prior to the formation of the web upon the Fourdrinier wire or the pressure of the calender rolls or the position of deckle rods. The means 44, in the case of a textile web, may be adapted to expand or contact the web width by controlling a tenter frame.

Referring to the manufacture of a paper web, the extend of shrinkage of the web during manufacture is of continuous concern and by controlling, for example, the amount of celluosic fibre in the water prior to the Fourdrinier wire it is possible to control the thickness of the web and the extent of expansion of web width under the influence of the calender rolls, and hence to control the extent of shrinkage as under the influence of heat.

Referring again to FIGS. 1 and 8 reference is made to a device for compensating the output of the meter 23 to provide a continuous selected correction for the selvedge encountered in the manufacture of a textile web. For example, a selvedge correction comprises twice the width of a single selvedge and this for example may vary between zero and one half inch. As shown in FIG. 1 a selvedge compensating pointer is shown designated 45 adapted to indicate a selvedge correction of zero, one-eighth, one-quarter, three-eighths, and one half inch. The selvedge correction scale is indicated at 46 (FIG. 1). In this form of the invention the selvedge correction means, as represented in FIG. 8, comprise two variable resistors 48 and 49 which are operatively interconnected, as indicated at 50, and which respectively may be interposed between the resistances 24, 29, and 25, 28. Suitable adjustment of these resistances with reference to the calibrated scale 46 will accomplish the selvedge correction desired.

In FIGURE 8 the web ingredient control means 44 are connected across the terminals 42, 43 in the same manner as shown in FIGURE 1, it being understood of course that any other suitable electrical connection for such control means may be employed, so long as the electrical parameter measured is representative of the difference in parameters produced by width changes of the web 12.

Referring now to FIGURE 5, the wand 10 as aforementioned is mounted on the pivot shaft 16 and is biased in a selected angular direction by any suitable means for example by a coil spring 16a which embraces the pivot shaft 16.

Referring now to FIGURES 6 and 7 there will be described an electrical parameter control means comprising a differential transformer which may be used in lieu of that of FIGURE 5. The wand 10 of FIGURE 6 is mounted by substantially identical means as described in connection with FIGURE 5, that is the wand 10 is mounted upon a pivot shaft 50, the latter being embraced by a coil spirng 51 and secured to any suitable mounting means such as a bracket 52. The wand thus is adapted for angular motion and for being gently pressed toward the edge of the moving web 12. Differential transformer 53 is mounted upon the bracket 52 and operatively connected to the wand 10 as by an arm 54 which controls a position of a core 55 in a coil of the differential transformer 53 by means of a connecting rod 56 which is secured to the arm 54.

Referring now to FIGURE 9 the operative interconnection of the differential transformer 53 with a second differential transformer 57, will now be described these transformers operating in a circuit which is somewhat analogous to the bridge circuit of FIGURE 8 as will further appear.

The differential transformer 57 preferrably is identical to transformer 53 and consists of a coil 58 having therein an axially core 59, the coil 58 and core 59 being analogous to the coil 55a and the core 55 of transformer 53.

Transformer 53 is provided with a coil 60 within which axially shifts the aforementioned core 55.

The coils 58 and 60 are connected in a bridge type circuit with a pair of variable resistances or potentiometers 61 and 62 consisting of resistances 63 and 64 which are contacted respectively by the contact arms 65 and 66.

As shown, opposite extremities of the coil 58 are connected each to an extremity of the resistances 63 and 64, and opposite extremities of the coil 60 are connected to opposite ends of the same resistances 63 and 64.

The function of the potentiometers 61 and 62 is identical to potentiometers 21 and 22 of FIGURE 8.

A selvedge compensator device, generally indicated at 67, is provided which is identical to the compensator 47 of FIGURE 8 and analogously connected in its bridge circuit as follows: the selvedge compensator 67 consists of a pair of variable resistances 68 and 69 which are connected on opposite sides of the bridge and in the manner shown in FIGURE 9, their variable contact arms being operatively interconnected to move in unison.

The operative interconnection between the adjustment arms of the resistances 68 and 69 may be dispensed with and individual adjustments thereof may be made. Alternatively one of the variable resistances 68 or 69 may be eliminated and the biasing adjustment for selvedge may be made by adjustment of the single remaining resistance but over a relatively smaller range.

A meter 70 is operatively associated with the bridge circuit of FIG. 9 by connecting same across the mid-points of the two inductance coils 58 and 60 and in turn connecting the meter across opposite or conjugal points of a full wave bridge rectifier generally indicated at 71. The other pair of conjugal points of the bridge 71 in turn are connected to the aforementioned mid-points of the inductance coils 58 and 60. Thus, the conjugal points 72 and 73 of the bridge 71 are respectively connected to mid-points 60a and 58a of the coils 58 and 60, and the meter 70 is connected across the conjugal points 74 and 75 of the bridge.

Referring to the calibrated scale of the meter, 23, or the meter 70, this instrument can constitute a milliameter and its scale, such as the scale 23b, may be calibrated between, for example, 52 inches and 62 inches for apparatus adapted for measuring the width of a moving web of textile material. The mean width of such web may be half way between namely 57 inches.

Note however that the scale of the meter 23 or 70 can be calibrated to indicate any desired span of units.

The apparatus comprising the present invention can be employed not only for measuring textile and paper web widths as mentioned above, but also for giving a continuous indication and recording of the width of any other types of web, for example, those of plastic or metal.

By properly selecting the torque characteristics of the elements 17 and 19, which may be referred to as transmitters or transducers (embracing the above described potentiometers or also differential transformers or also self-synchronous motors), and also selecting the characteristics of the springs such as the spring 16a (FIG. 5), it is possible to position such transmitters accurately by the wands with negligible error. The latter is true even though the web material being measured is of extremely light weight including silks or rayons. It is possible by means of the present invention to design the wand mounting means in such a manner that the force exerted upon the edge of the web material is of extremely small degree, for example, less than ten milligrams.

There is thus provided a novel apparatus for continuously recording the useful width of a web of sheet material. A thorough knowledge of the variation in width of the web material over its entire length is necessary in order that a maximum efficiency may be obtained in selection of the web material for pattern size and pattern positioning. Such pattern use may be accomplished with maximum utilization of the web material.

The circuits which have been developed for operative interconnection with the edge sensing means above described are stabilized to compensate for power line variation, for example, between 70 and 140 volts or between any selected voltage range. Such circuits can be so calibrated that the stylus trace upon the strip 38 (FIG. 1) reads directly in inches to a tolerance well within the required limits of accuracy.

The aforementioned double-selvedge width is compensated for prior to the making of the recording by the stylus tracing as described in connection with FIGURE 1 thereby providing a documented and permanent indication of the useable portion of the web material.

In lieu of the particular electrical parameter producing and parameter differential sensing devices described above in connection with FIGURES 1, 8 and 9 it is possible to employ the following: a pair of self-synchronous motors respectively operatively connected to the wands 10 and 11, the self-synchronous motors being electrically connected to a synchro-differential receiving indicator which will produce an indication representative of a difference in angular position of the wands 10 and 11, that is if the wands move from a norm in the same direction by the same amount there will be no indication by the synchro-differential receiver indicator, but if such wands move in opposite directions or if they move in the same directions different amounts the synchro-differential receiver indicator will produce an indication representative thereof.

I claim:

1. In a web width measuring device, a pair of wands mounted in spaced relation on opposite sides of the path of a continuously moving web; said wands having finger portions for continuously contacting respectively the opposite edges of the web; means for mounting said wands for movement responsive to movement of such web edges whereby lateral motion of the web which causes equal movement of the wands in a common direction produces no change in the distance between said fingers, but any change in web width results in an unequal movement of the wands in opposite or the same directions, or equal wand movement in opposite directions, or movement of only one wand, the other remaining unmoved; a pair of potentiometers operatively connected to respective said wands for adjustment thereby; a balanceable bridge circuit in which said potentiometers are connected, said potentiometers and bridge circuit being designed for energization by direct current; a selvedge correction means comprising a pair of variable resistors connected to said bridge circuit in opposite arms thereof, means for mechanically operatively interconnecting said resistors for responding together to a common adjustment; and means responsive to the extent of bridge circuit unbalance for indicating web width said means being directly responsive to such unbalance and free of amplifying means to amplify the energy reflecting such unbalance.

2. In a web width measuring device, a table over which the web is drawn; a pair of low inertia wire wands mounted in spaced relation on one side of said table, said wands having finger portions which extend up through slots in said table to continuously contact, respectively, the opposite edges of such web; means for mounting said wands for movement responsive to the movement of such web edges whereby lateral motion of the web which causes equal movement of the wands in a common direction produces no change in the distance between said finger portions, but any change in web width produces a change in such distances between said finger portions; means for producing an electrical parameter in response to the movement of each of said finger portions; means for sensing differences in such parameters; and means for indicating such differences.

3. In a web width measurnig device, a table over which the web is drawn; a pair of low inertia wire wands looped at one end to form finger portions which extend up through slots in said table for continuously contacting, respectively, the opposite edges of such web; means for mounting said wands for movement responsive to movement of such web edges whereby lateral motion of the web which causes equal movement of the wands in a common direction produces no change in the distance between said finger portions, but any change in web width results in an unequal movement of the wand in opposite or the same directions, or equal wand movement in opposite directions, or movement of only one wand, the other remaining unmoved; a pair of potentiometers having wiper arms operatively connected to respective ones of said wands for adjustment thereby; a Wheatstone bridge circuit in which said potentiometers are connected; a voltage indicating means connected across said Wheatstone bridge circuit for making direct measurements in voltage unbalances produced in said bridge by changes in adjustment of the wiper arms of said potentiometers, said voltage indicating means being calibrated to represent changes in net web width.

References Cited by the Examiner

UNITED STATES PATENTS

| | | | |
|---|---|---|---|
| 1,219,345 | 3/1917 | Newell | 340—259 |
| 2,317,419 | 4/1943 | Taylor | 323—75 |
| 2,437,639 | 3/1948 | Floyd | 33—147 |
| 2,569,949 | 10/1951 | Prescott | 323—75 |
| 2,623,929 | 12/1952 | Moody | 323—75 |
| 2,627,178 | 2/1953 | Hayward et al. | 73—313 X |
| 2,686,293 | 8/1954 | Davis | 323—75 |
| 2,815,480 | 12/1957 | Ruge | 323—75 |
| 2,848,815 | 8/1958 | Scheu | 33—148 X |
| 2,869,367 | 1/1959 | Moore | 73—367 |
| 3,007,252 | 11/1961 | Munn | 33—178 |
| 3,021,495 | 2/1962 | Minter | 323—75 |

OTHER REFERENCES

Publication: Mechanical Measurements by Electrical Methods, by Howard (pp. 137 and 138 relied on).

ISAAC LISANN, *Primary Examiner.*